United States Patent Office  3,389,963
Patented June 25, 1968

3,389,963
CATALYTIC DECOMPOSITION OF HYDROGEN PEROXIDE
Herman J. Baumgartner, Danville, and George C. Hood, Orinda, Calif., and Donald D. Weaver, Houston, Tex., assignors to Shell Oil Company, New York, N.Y., a corporation of Delaware
No Drawing. Continuation-in-part of application Ser. No. 312,355, Sept. 30, 1963. This application Dec. 3, 1963, Ser. No. 327,817
The portion of the term of the patent subsequent to Aug. 1, 1984, has been disclaimed
13 Claims. (Cl. 23—204)

ABSTRACT OF THE DISCLOSURE

The loss of a silver-containing catalyst in a process of hydrogen peroxide decomposition is reduced by employing hydrogen peroxide having dissolved therein zinc or cadmium salts of certain organic acids.

---

This invention relates to new hydrogen peroxide compositions advantageous for use in the silver-catalyzed decomposition of the hydrogen peroxide to steam and oxygen.

Difficulty has been encountered in the past due to excessive loss of silver during the decomposition of hydrogen peroxide with solid silver catalysts. This is a serious disadvantage, especially in reaction motors, control devices for rockets, and the like, where it is highly important that the loss of catalyst be held to a minimum so that a long, effective life can be obtained with the smallest possible amount of catalyst.

In our copending application, Ser. No. 300,919, filed Aug. 8, 1963, we have described a method for overcoming this difficulty by the use of certain inorganic salts of cadmium or zinc. In another of our copending applications, Ser. No. 312,355, filed Sept. 30, 1963, now U.S. Patent No. 3,347,630, of which the present application is a continuation-in-part, we have described another class of salts which is also useful for this same purpose and have explained that this other class of salts can not only be used for this purpose alone but can be used with special advantage in combination with certain additives which are themselves beneficial in the silver-catalyzed decomposition of hydrogen peroxide. Among the beneficial hydrogen peroxide additives there described are salts, both organic and inorganic, of cadmium and zinc. The present invention is directed to hydrogen peroxide compositions which contain organic salts of cadmium and/or zinc which are effective in hydrogen peroxide, with or without other additives, in reducing the loss of silver during silver-catalyzed decomposition of the hydrogen peroxide. The improved hydrogen peroxide decomposition process using these organic salts in the hydrogen peroxide solution is another aspect of the present invention.

In accordance with the present invention, the loss of silver during decomposition of hydrogen peroxide by contact with a metallic silver-containing catalyst is reduced by contacting the catalyst with hydrogen peroxide which has dissolved therein a salt of a fixed-valent metal of Group II-B of the Periodic Table of Mendelejeff having an atomic number of at least 30 and an organic acid which has directly attached to the carboxyl group no hydrocarbon group in which as many as 80% of the hydrogen atoms have been replaced by halogen. To avoid poisoning of the silver catalyst surface, it is desirable to use salts of organic acids which do not introduce into the hydrogen peroxide anions which form silver salts having a solubility less than 3 milligrams in one liter of water at 20° C. Most advantageously, zinc or cadmium salts of organic acids which also do not have an adverse effect upon the stability of hydrogen peroxide in storage are employed in the process. In choosing the form of the organic salt to be added as decomposition activator, consideration should, of course, be given to the general specifications which have been set for hydrogen peroxide intended for decomposition using silver catalysts. The military specification for hydrogen peroxide for use in reaction motors (MIL-H-16005C as modified by Supplemental Data Sheet of April 10, 1962) sets these limits for components of the peroxide:

|  | Mg/l. |
|---|---|
| $PO_4$ | 0.5 max. |
| Al | 0.6 max. |
| $NO_3$ | 3.0 min.→5.0 max. |
| $SO_4$ | 3.0 max. |
| $NH_4$ | 2.6 max. |
| Sn | 4.0 max. |
| Cl | 1.0 max. |
| C | 200.0 max. |

It is on this account that salts of organic acids which are substituted by phosphate or halides are less desirable as anions for the promoters of the invention. Preferred zinc and/or cadmium salts are those of organic acids which have attached to the carboxyl no hydrocarbon group in which as much as 80% of the hydrogen atoms have been replaced by halogen atoms.

Examples of suitable organic acids whose zinc or cadmium salts can be used in the invention are the monocarboxylic acid salts, particularly fatty acid salts such as formates, acetates, butyrates, pivalates, and the like, and aromatic acid salts such as the benzoates, toluates, etc. Examples of sulfur-containing organic acids whose salts can also be used are methyl sulfonic acid, ethyl sulfonic acid, etc. Salts of substituted organic acids can be used as well as the foregoing unsubstituted acids. Thus, salts of halogenated acids which do not poison the silver catalyst can be used, although preferably salts of acids which have linked to the carboxyl, a hydroacrbon group in which 60% or more of their hydrogen atoms replaced by halogen are not employed. Other suitable substituted acids whose salts can be used are, for example, hydroxy acids such as lactic acid, and the like. One can also use successfully salts of polycarboxylic acids whose silver salts have a solubility preferably greater than 5 milligrams per liter, zinc, and cadmium salts of unsubstituted monocarboxylic acids free from nonaromatic multiple linkages between carbon atoms and having 1 to 8 carbon atoms per molecule are especially useful.

The organic zinc and cadmium salts are advantageously used in amounts which introduce into the peroxide about 0.1 to about 10 milligrams of total zinc and/or cadmium per liter of the hydrogen peroxide, most advantageously amounts which provide from about 0.3 to about 3 milligrams of these metals per liter are used.

The hydrogen peroxide can contain other components which do not interfere with the desired catalytic decomposition. These includes stabilizers for the hydrogen peroxide, many of which are in use. Preferably sodium stannate or the like is used as stabilizer.

There are advantages in using the organic zinc and/or cadmium salts chosen as additives for the hydrogen peroxide in combination with certain special other additives which also have a beneficial effect upon the catalytic decomposition of the peroxide by silver or like catalysts. Particularly desirable among these other additives are the inorganic salts of zinc and/or cadmium and/or the salts of nickel or of the rare earth metals, having atomic numbers 57 through 71, for example, lanthanum, cerium, samarium, europium, gadolinium, neodymium, dysprosium, erbium, ytterbium, and the like, for instance, yttrium, as described in the previously mentioned copending patent application. These decomposition promoting additives are preferably used in an amount corresponding to the addition of about 0.2 to about 10, preferably about 0.3 to about 3 milligrams of their metals per liter of hydrogen peroxide solution.

The hydrogen peroxide decomposed preferably has a concentration of at least 30% by weight and more advantageously is concentrated hydrogen peroxide of 80% wt. strength or higher, most preferably about 90 to 100% wt. concentration.

The metallic silver-containing catalysts used in the process of the invention include pure or substantially pure silver catalysts and alloys or mixtures of metallic silver with other metals which may or may not be themselves catalyst for hydrogen peroxide decomposition. Alloys of silver with a minor amount of other catalytic metal are particularly useful. Among the other catalytic metals which can be used with silver catalysts are, for instance, precious metals such as, platinum, palladium, rhodium, iridium, osmium, and the like.

The silver catalyst or silver catalyst-containing mixture used for hydrogen peroxide decomposition according to the invention can be employed in any of the customary forms. They can, for example, be used in the forms of screens, perforated plates, or the like, which can be superimposed on each other to make a fixed bed through which the hydrogen peroxide can be passed without excessive pressure drop. United States Patent 2,865,721, for example, described suitable catalyst bed assemblies containing silver catalysts which can be used in the process of the present invention. Beds of granular or other porous forms of silver-containing decomposition catalyst can also be used.

While it is a special advantage of the process of the invention that the decomposition of the hydrogen peroxide can be initiated at low, initial temperatures, this is not essential for successful operation which can be carried out with hydrogen peroxide at any temperature and pressure at which the peroxide feed is in the liquid state. Feed temperatures of the order of about −20° to about 100° C. and operating pressures of atmospheric to about 100 atmospheres are generally suitable, but other operating conditions can also be used.

The source of the hydrogen peroxide which is decomposed is not important in the new process, which can be carried out successfully with hydrogen peroxide from any source. The new method has been used with hydrogen peroxide of different kinds and can be advantageously employed with hydrogen peroxide from organic sources, such, for instance, as the oxidation of alkyl anthraquinones, or alcohols, or hydrocarbons, or hydrazobenzenes, for example, as well as with electrolytic hydrogen peroxide.

The following examples illustrate in more detail suitable methods for carrying out the new process and show some of its advantages. In these examples, the decomposition efficiencies in the various tests are reported as the number of gram moles of hydrogen peroxide which were decomposed per gram of catalyst metal lost at a standard catalyst area and length of time of operation. This is the single most significant parameter with respect to performance in practical motors, and a high efficiency of this kind characterizes the most desirable hydrogen peroxide feed for the motor. A high, specific hydrogen peroxide decomposition rate is also advantageous as previously pointed out since it provides improved starting at low temperatures and results in reduction of the time required for starting a decomposer at a given temperature.

EXAMPLE I

Dynamic tests were carried out which determined the rates of hydrogen peroxide decomposition and of loss of catalyst at the inlet of a hydrogen peroxide decomposer using a silver catalyst. The liquid 90% wt. hydrogen peroxide feed was pressured from a 347 stainless-steel tank with nitrogen through an automatic valve controlled by a Pedersen automatic feed rate balance using a flow rate of 45 grams of the hydrogen peroxide per minute. The feed hydrogen peroxide was heated to reaction temperature in a section of ⅛-inch stainless-steel tubing immersed in a water bath. After contacting the catalyst in the form of a pure silver rod ¼-inch long and ⅛-inch in diameter into which a thermocouple was silver soldered, the effluent was passed through a cooler, back pressure regulator and gas-liquid separator. The average of the temperatures of the hydrogen peroxide steam measured with thermocouples just before and after the silver catalyst was 25° C. during the test which was carried out at 300 p.s.i.a. The loss of catalyst was determined by accurate weighing of the silver specimen before and after the test which was carried on for 30 minutes. With hydrogen peroxide produced via oxidation of secondary alcohol and analyzing less than 0.05 milligram each of tin and phosphorus (from sodium stannate and sodium pyrophosphate stabilizers) and 0.20 milligram of aluminum and 0.04 milligram of chloride per liter of peroxide solution which had a pH of 0.7 direct meter reading, the following results were obtained with representative organic zinc salts as the promoters.

| Additive (in solution in the hydrogen peroxide) | Amount of metal ion (milligrams per liter of $H_2O_2$ solution) | $H_2O_2$ decomposition rate (moles $H_2O_2$ decomposed per sq. cm. catalyst surface, minute) | Decomposition efficiency (moles of $H_2O_2$ decomposed per gram of silver lost) |
|---|---|---|---|
| None | None | 0.063 | 604 |
| Zinc acetate | 1.0 | 0.134 | 1,660 |
| Zinc benzoate | 1.0 | 0.226 | 4,340 |

Good results are also obtained when equivalent amounts of zinc are dissolved in the hydrogen peroxide in the form of the formate or isobutyrate.

EXAMPLE II

Tests carried out in the same way as described in Exampl I but using cadmium acetate as the additive in 90% hydrogen peroxide in an amount of 2.0 milligrams per liter of solution, produces a corresponding increase in the efficiency of the hydrogen peroxide decomposition.

These results are in contrast with those obtained when beryllium or magnesium salts are used in place of the zinc and cadmium. The salts of these other Group II metals give essentially no improvement in the silver catalyzed decomposition. With $Mg(NO_3)_2 \cdot 6H_2O$, for example, in an amount equivalent to 1.4 milligrams of magnesium per liter of hydrogen peroxide, the decomposition rate, when using the same hydrogen peroxide was 0.090 mole per sq. cm. of catalyst surface, minute; and the decomposition efficiency was 535 moles of $H_2O_2$ per gram of silver lost.

EXAMPLE III

The effectiveness of the additives of the invention when used with hydrogen peroxide which contained 2 milligrams of nitrate ion per liter added in the form of sodium nitrate is shown by the following results obtained in tests carried out as described in Example I.

| Additive (in solution in the hydrogen peroxide) | Amount of metal (milligrams per liter of $H_2O_2$ solution) | $H_2O_2$ decomposition rate (moles $H_2O_2$ decomposed per sq. cm. catalyst surface, minute) | Decomposition efficiency (moles of $H_2O_2$ decomposed per gram of silver lost) |
|---|---|---|---|
| None | None | | |
| Zinc acetate | 1.0 | 0.124 | 1,520 |

With cadmium formate in place of the zinc acetate, a similar good improvement in the hydrogen peroxide decomposition rate and efficiency of decomposition is obtained with the same hydrogen peroxide and silver catalyst.

The invention is not restricted to the foregoing organic salts chosen by way of example since successful decomposition can be obtained with any zinc and/or cadmium salts of organic acids whose silver salts have a solubility in water at 20° C. of at least 4 milligrams per liter of hydrogen peroxide solution being decomposed.

We claim as our invention:

1. In a method of decomposing hydrogen peroxide by contact with a metallic silver-containing catalyst, the method of reducing loss of silver from said catalyst during the decomposition which comprise carrying out said contact with hydrogen peroxide containing dissolved therein a salt of a fixed-valent metal of Group II–B of the Periodic Table having an atomic number of at least 30 and an organic acid which has directly attached to the carboxyl group no halogenated hydrocarbon group in which as many as 80% of the hydrogen atoms have been replaced by halogen and whose silver salts have a solubility of at least 3 milligrams per liter of water at 20° C., the amount of said salt being sufficient to introduce into the hydrogen peroxide at least 0.1 milligram of said metal per liter of peroxide.

2. In a method of decomposing hydrogen peroxide by passage through a bed of solid silver-containing catalyst, the improvement whereby loss of silver from said bed is reduced, which comprises
feeding to said bed hydrogen peroxide having dissolved therein a zinc salt of an organic acid which has directly attached to the carboxyl group no hydrocarbon group in which as many as 80% of the hydrogen atoms have been replaced by halogen and whose silver salts have a solubility of at least 3 milligrams per liter of water at 20° C., the amount of said salt being sufficient to introduce into the hydrogen peroxide at least 0.1 milligram of zinc per liter of peroxide.

3. A method of decomposing hydrogen peroxide in accordance with claim 2 wherein the zinc salt is a salt of an unsubstituted carboxylic acid and is present in an amount equivalent to about 0.1 to about 10 milligrams of zinc per liter of hydrogen peroxide used.

4. A method in accordance with claim 3 wherein the zinc salt is a salt of a fatty acid having 1 to 5 carbon atoms per molecule.

5. A method in accordance with claim 4 wherein the hydrogen peroxide contains about 0.2 to about 3 milligrams of zinc as zinc acetate per liter of solution.

6. A method in accordance with claim 3 wherein the hydrogen peroxide contains about 0.2 to about 3 milligrams of zinc as zinc benzoate per liter of solution.

7. In a method of decomposing hydrogen peroxide by passage through a bed of solid silver-containing catalyst, the improvement whereby loss of silver from said bed is reduced, which comprises
feeding to said bed hydrogen peroxide having dissolved therein a cadmium salt of an organic, acid which has directly attached to the carboxyl group no hydrocarbon group in which as many as 80% of the hydrogen atoms have been replaced by halogen and whose silver salts have a solubility of at least 3 milligrams liter of water at 20° C., the amount of said salt being sufficient to introduce into the hydrogen peroxide at least 0.1 milligram of cadmium per liter of peroxide.

8. A method of decomposing hydrogen peroxide in accordance with claim 2 wherein the cadmium salt is a salt of an unsubstituted carboxylic acid and is present in an amount equivalent to about 0.1 to about 10 milligrams of cadmium per liter of hydrogen peroxide used.

9. A method in accordance with claim 8 wherein the hydrogen peroxide contains about 0.1 to about 10 milligrams of cadmium as cadmium salt of a lower fatty acid per liter of solution.

10. A method in accordance with claim 9 wherein the hydrogen peroxide contains about 0.2 to about 3 milligrams of cadmium as cadmium acetate per liter of solution.

11. Hydrogen peroxide containing dissolved therein an amount of a salt of a fixed-valent metal of Group II–B of the Periodic Table having an atomic number of at least 30 and an organic acid which has directly attached to the carboxyl group no hydrocarbon group in which as many as 80% of the hydrogen atoms have been replaced by halogen and whose silver salts have a solubility of at least 3 milligrams per liter of water at 20° C.,
the amount of said salt being such as will provide about 0.1 to about 10 milligrams of said metal per liter of hydrogen peroxide solution.

12. Hydrogen peroxide having dissolved therein a zinc salt of a lower fatty acid in an amount sufficient to provide about 0.2 to about 3 milligrams of zinc per liter of solution.

13. Hydrogen peroxide having dissolved therein a cadmium salt of a lower fatty acid in an amount sufficient to provide about 0.2 to about 3 milligrams of cadmium per liter of solution.

References Cited

FOREIGN PATENTS 48,542  12/1888  Germany.
700,864  12/1953  Great Britain.

OSCAR R. VERTIZ, *Primary Examiner.*

H. S. MILLER, *Assistant Examiner.*